A. G. GROMMET.
PASSENGER RECORDER.
APPLICATION FILED DEC. 12, 1906. RENEWED MAY 18, 1908.
No. 906,704.
Patented Dec. 15, 1908.
3 SHEETS—SHEET 1.
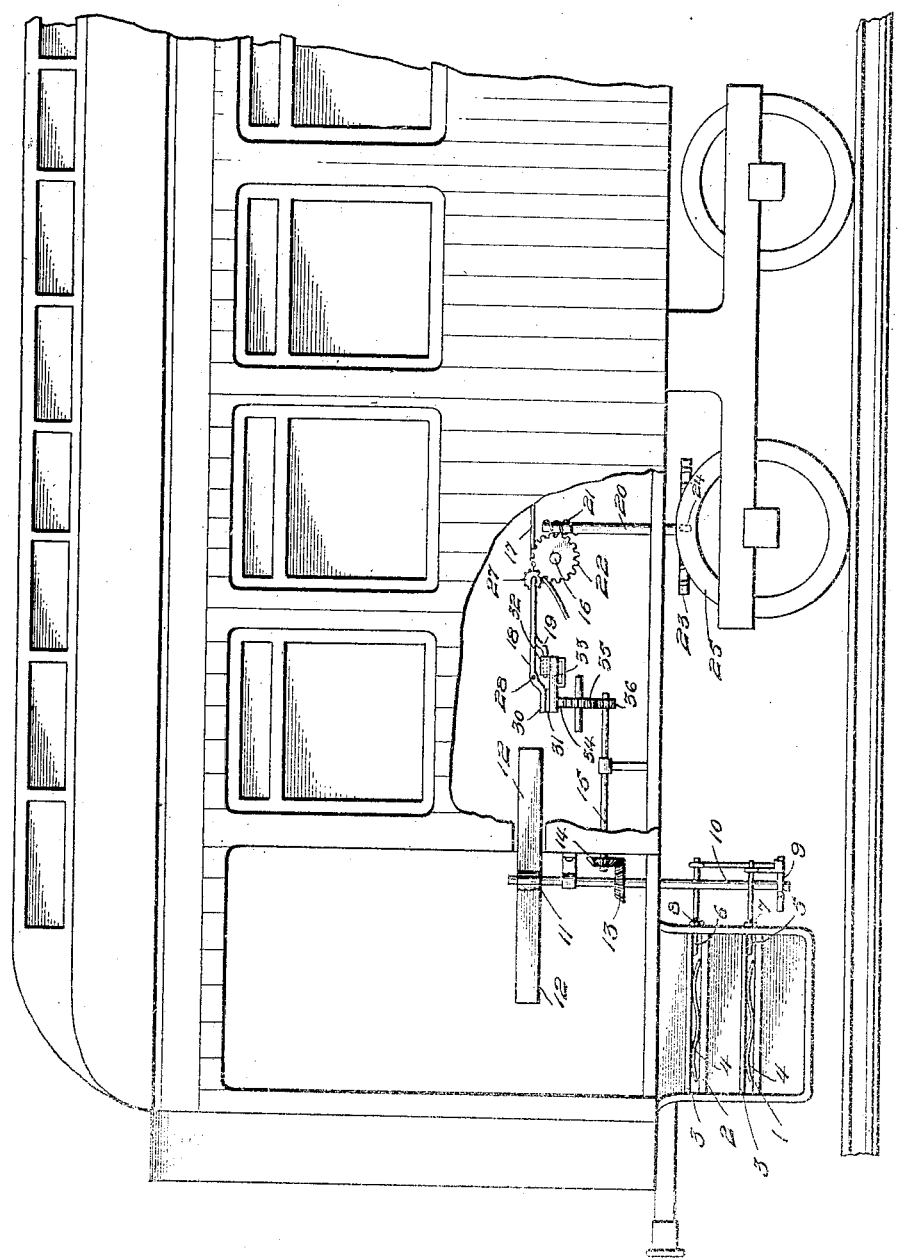

A. G. GROMMET.
PASSENGER RECORDER.
APPLICATION FILED DEC. 12, 1906. RENEWED MAY 18, 1908.
906,704.
Patented Dec. 15, 1908.
3 SHEETS—SHEET 2.
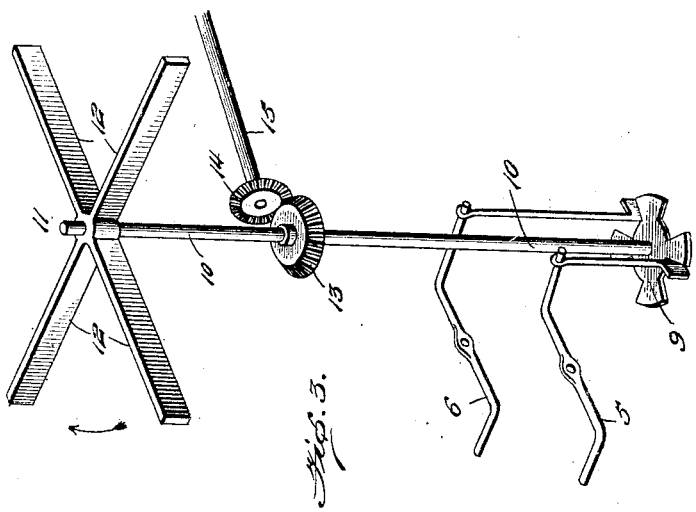
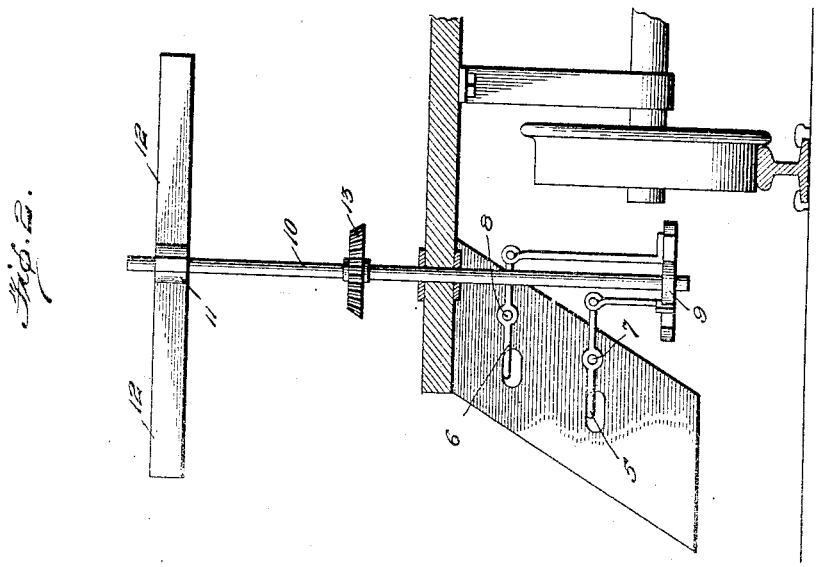
Witnesses
B. M. Offutt
G. M. Spring
Inventor
Adolph G. Grommet
By David T. Mead
Atty.

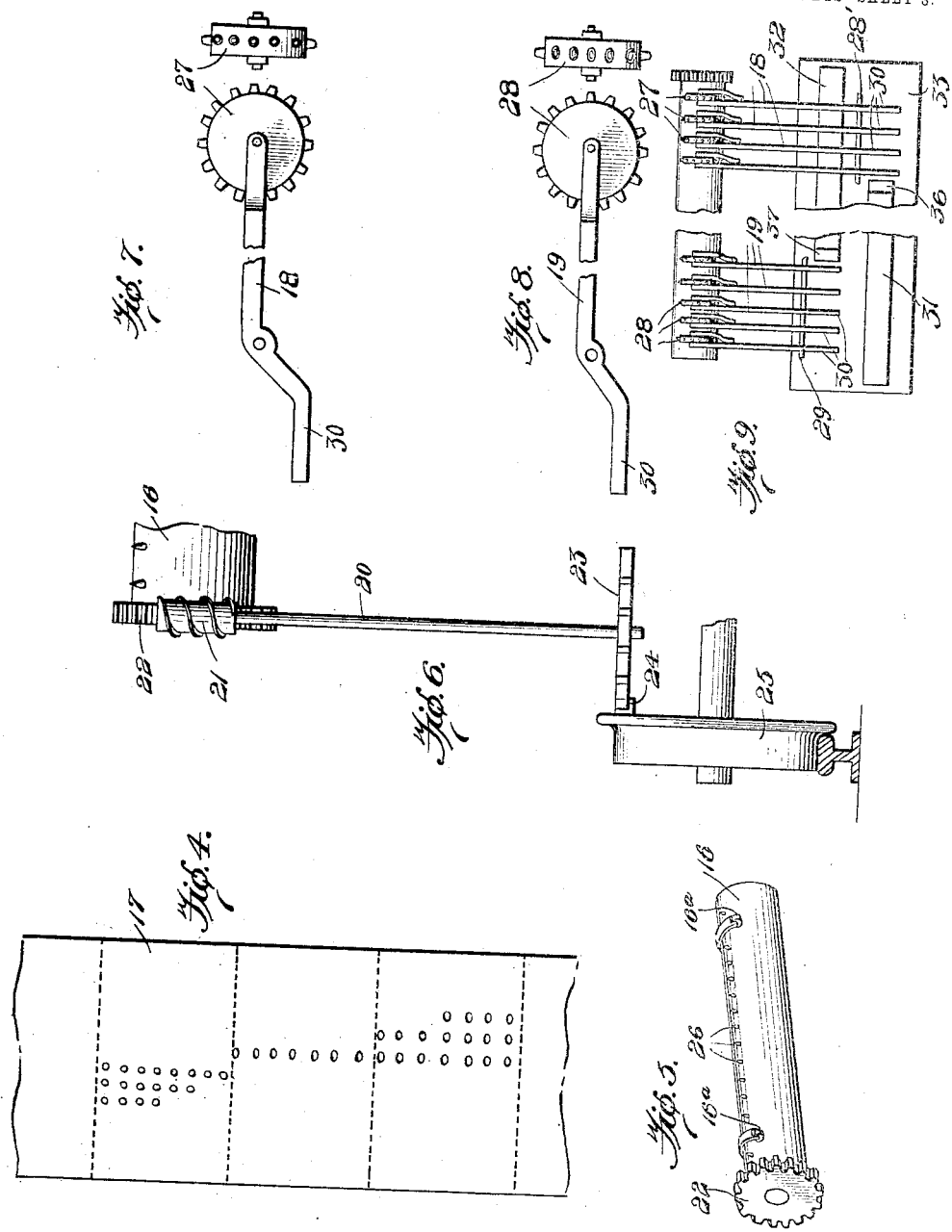

UNITED STATES PATENT OFFICE.

ADOLPH G. GROMMET, OF ALTON, ILLINOIS.

PASSENGER-RECORDER.

No. 906,704.  Specification of Letters Patent.  Patented Dec. 15, 1908.

Application filed December 12, 1906, Serial No. 347,456. Renewed May 18, 1908. Serial No. 433,593.

*To all whom it may concern:*

Be it known that I, ADOLPH G. GROMMET, a citizen of the United States, residing at Alton, in the county of Madison and State of Illinois, have invented certain new and useful Improvements in Passenger-Recorders, of which the following is a specification.

This invention relates to passenger recorders, and it relates particularly to means for recording the number of passengers riding on a car or a train of cars and the total number of miles ridden by such passengers.

The object of the invention is to provide simple and accurate means whereby as a passenger mounts or descends the steps of a car there shall be created with accuracy and certainty a record of either of such movements on a record slip, which slip shall be so marked as to indicate the number of miles which the car moves between the times when the passengers board and when they leave the car by way of the steps.

With this object in view the invention consists of the general and specific features of construction and arrangement of parts substantially as hereinafter described.

In the accompanying drawings I have illustrated one form of embodiment of the device for carrying out the various functions of my invention.

In these drawings:—Figure 1 is a side view of the end of a car having my device placed in position thereon, the side of the car being broken away to show the location of the recorder. Fig. 2 is a detail view of the steps of a car of a form to coact with the other parts of my recording apparatus; Fig. 3 is a detail view of a turnstile adapted to be placed adjacent to the steps, showing the means whereby the movements of the turnstile are regulated by the weight of a passenger being imposed upon one or the other of the steps, and also showing the connection between the turnstile and the recording device. Fig. 4 is a detail showing the record strip and the means of indicating thereon the number of passengers entering or leaving the train; Fig. 5 is a view of the roller by which the record slip is moved and by which there is indicated on the slip the number of miles moved by the car; Fig. 6 is a detail view showing the means for rotating the roller shown in Fig. 5; Fig. 7 is a detail of one of the arms and its perforating wheel which are operated to indicate the ascent of the steps by passengers entering a car; and Fig. 8 is a detail view of one of the arms and its perforating wheels by which the descent of the steps of a car by passengers leaving a car is indicated on the record strip after a number of passengers indicated as boarding the particular car have left the same by way of the steps. Fig. 9 is a fragmentary view showing the relative positions of the perforating fingers and their actuating wedges.

In these drawings, the steps of a car are indicated respectively by the numbers 1, 2. The upper surface or tread of each step is capable of a slight up and down movement and is so arranged that it will be depressed as the weight of a passenger is imposed upon it and will be returned to its normal position when the weight is removed. To accompish this the upper surface of each step may be made as herein shown of a board or plate 3 hinged at its rear end and having a leaf spring 4 interposed between it and the lower face of the step as shown in Fig. 2.

Attached to each of the steps 1, 2, are right angular arms, marked respectively 5 and 6 in the drawing, which arms are respectively pivoted at points 7 and 8 on the side of the steps. The free ends of the arms 5 and 6 are adapted to engage the teeth of a disk 9 attached to the shaft 10 of a turnstile 11.

The turnstile is mounted on the platform of a car in such position that its arms 12 project across the steps 1 and 2 about midway of them and is so arranged that a passenger entering or leaving the car is obliged to pass between the arms of the turnstile and to give the shaft 10, to which the arms 12 of the turnstile are rigidly connected, a quarter turn in one direction or the other as a passenger passes to enter or leave a car.

The arms 5 and 6 project from opposite directions and extend normally between the teeth of the disk 9. As a passenger starts to board the car his weight comes first on a step 1 and thus the arm 5 is raised to clear a tooth of the disk. The turnstile is turned in the direction indicated by the arrow in Fig. 3 as the passenger ascends and when his weight is transferred from the lower to the supper step the end of the lever 5 is released allowing it to fall into the next succeeding space between the teeth of the disk. As the weight of the passenger comes on the step 2 the lever 6 is removed from contact with the tooth with which it is brought into contact by the turning of the turnstile occasioned by the passenger ascending. In passing from the step 2 the turnstile is rotated and the lever 6 is allowed to drop into the next succeeding space between the teeth of the disk. The normal positions of the ends of the levers is as shown in Fig. 3.

As a passenger descends the turnstile is rotated in a direction opposite to that in which it is moved by a passenger ascending the steps and the weight is imposed first on the upper and then on the lower step moving first the lever 6 and then the lever 5 out of and then into the spaces between the teeth on the disk 9.

In each operation the shaft of the turnstile is allowed one quarter revolution in one direction or the other, and after each revolution the levers are left in position to prevent rotation of the shaft in either direction without first raising one of the levers 5 or 6.

Fixed to the shaft 10 is a crown gear wheel 13 which meshes with a corresponding gear wheel 14, on a shaft 15, through which movement is transmitted to a recorder to indicate the number of passengers entering or leaving a car.

The recorder is composed principally of a roller 16 over which a strip of paper 17 passes and which is fed along as the roller rotates, and the two sets of perforating fingers 18 and 19. The paper is held in position against the roller 16 by spring pressed wheels 16ª to insure its smooth and uniform passage over the roller. The roller 16 is rotated through a shaft 20 having on it a worm 21 meshing with a gear 22 fixed to the roller 16. Motion is given the shaft 20 through a sprocket wheel 23 fixed to the shaft and having its teeth projecting into the path of a projection 24 extending from the face of one of the wheels 25 of the car by which means the shaft is rotated partially at each revolution of the car wheel. The proportions and arrangements of the parts is such that the roller 16 is given one complete revolution as the car wheel makes a sufficient number of revolutions to traverse one mile of rails.

The roller 16 has on its surface a row of projections 26 extending in a straight line from end to end thereof, so that the paper strip, as it passes over the roller, has marked across it a row of perforations as the car on which the device is arranged completes each mile of its journey.

Each of the fingers 18 has on its end projecting above and normally resting on the paper on the roller 16, a small wheel 27 having projections circular in cross section extending therefrom, while each of the fingers 19 has a corresponding wheel 28 having projections oval in cross section extending therefrom.

The fingers 18 are pivoted on a bar 28 while the fingers 19 are pivoted on a bar 29. Each finger of the two series has depending from it a projection 30. The projections from the fingers 18 are adapted to be engaged by a longitudinally movable wedge 31, while the fingers 19 are operated by a corresponding wedge 32 arranged a short distance forward of the wedge 31. The two wedges are so arranged that each is capable of being moved the entire distance allowed by it to contact with all the projections of the fingers to be operated by it without contacting with the projections of the other set of fingers.

Both the wedges are joined to and carried by a bar 33 having teeth 34 on its lower edge and below and meshing with the teeth is a gear wheel 35, which meshes with a pinion 36 on the shaft 15.

In the operation of the device a passenger stepping on the lower step to board a car releases the turnstile shaft by raising the arm 5 and when passing through the arms of the turnstile moves the arm barring his way one eighth revolution at which point the movement of the turnstile is arrested by the contact of the arm 6 with a projection on the disk attached to the shaft of the turnstile. After the turnstile has been given one eighth of a revolution the end of the arm 5 will bear upon and be supported by one of the projections of the disk on the turnstile shaft, and the arm 6 will bear against one of the projections arresting further movement in the same direction. As the passenger treads on the upper step the arm 6 is raised and thus the turnstile is allowed to be turned an additional eighth of a revolution when it is checked by the arm 5 contacting with one of the projections into the path of which it has dropped. On the completion of the quarter revolution the end of the arm 6 drops into position between two of the projections and bears against one of them to lock the shaft against turning in one direction while turning in the opposite direction is prevented by the arm 5. The shaft is thus locked against rotation until the weight of a passenger is brought upon one or the other of the steps. As a passenger treads on the steps in leaving a car the arms 5 and 6 are operated in reverse order to that described and the shaft is permitted to be turned a quarter revolution in a direction opposite to that given it as a passenger enters. The quarter revolution of the shaft of the turnstile is transmitted through the shaft 15 and the described gearing to the wedges 31 and 32, moving them to the left. The incline 36 of the surface of the wedge 31 is such that as it is thus moved the projection 30 of the inner finger of the series 18 is engaged and moved upward, forcing the wheel on the other end downward to bring its projections into contact with the paper interposed between the roller and the wheel. This operation is repeated as each passenger ascends the steps to enter the car, the wedge being moved forward one step to force a finger to bring its perforating wheel into operation as each passenger enters through the turnstile. As the car moves the roller 16 is rotated carrying the paper over its surface and at the end of each mile a transverse row of perforations is made in the paper. Thus it will be seen that as the paper record is moved forward a line of perforations is made by each perforating wheel put into play as described, and these lines are intersected at each mile by the perforations on the roller 16, rendering the record easily computable to determine the number of miles for which fares must be accounted for.

Of course as each passenger leaves a car by way of the steps the fingers 18 are put out of operation one by one by reason of the wedge 31 being moved in reverse direction by the rotation of the turnstile in a direction opposite to that first described. If each car were accessible only to passengers who enter by way of the steps only one set of perforating fingers would be necessary, but when a car is one of a train it is necessary to provide for means for recording the leaving by way of the steps of more passengers than entered. When a number of passengers corresponding to the number who entered a car have left the same the fingers of the series 18 are out of operation and each additional passenger leaving puts into operation, through the turnstile, the wedge 32 having incline 37 and the described connections one of the perforating fingers of the series 19 with the result that a corresponding number of elongated perforations are made in the paper record throughout the remainder of the journey of the car. A comparison of the records of the different cars will give an accurate aggregate of the number of miles traveled by all the passengers on all the cars.

Having thus described my invention, what I claim as new and desire to secure by Letters Patent, is:—

1. A passenger recorder comprising a turnstile arranged at the entrance to a car, car steps having depressible treads, arms connecting the depressible treads and the shaft of the turnstile whereby the latter is released and arrested, means for moving a strip of paper, perforating fingers, and means interposed between the shaft of the turnstile and the fingers whereby the latter are successively brought into operative position as the turnstile is rotated, substantially as described.

2. A passenger recorder comprising a turnstile arranged at the entrance to a car and having its shaft provided with a disk having projections, car steps having depressible treads, pivoted arms attached to the treads and adapted to engage the projections of the disk whereby the movement of the turnstile is permitted and arrested, means for moving a strip of paper, perforating fingers, and means operated by the turnstile for bringing the fingers into and out of operative position, substantially as described.

3. A passenger recorder comprising a turnstile arranged at the entrance to a car, means for moving a record strip longitudinally, a series of perforating fingers, a wedge adapted to contact with the fingers and means interposed between the turnstile and the wedge whereby as the turnstile is rotated in one direction or the other the fingers are brought into or out of operative position, substantially as described.

4. A passenger recorder comprising a turnstile arranged at the entrance to a car, means for moving a record strip longitudinally, a series of fingers having wheels provided with projections, a movable wedge adapted to contact with the fingers, and a connection between the turnstile and the wedge whereby as the turnstile is moved in one direction or the other the rollers are brought into or out of operative position, substantially as described.

5. A passenger recorder comprising a turnstile arranged at the entrance to a car, a roller having a series of projections extending across the same and adapted to move and perforate at intervals a record strip, means operated by a wheel of the car for revolving the roller, perforating fingers adapted to bear on a record strip carried by the roller, and means interposed between the turnstile and the fingers whereby the latter are forced toward the roller or released as the turnstile is rotated in one direction or the other, substantially as described.

6. A passenger recorder comprising a turnstile arranged at the entrance to a car, means for moving a record strip, two series of fingers each bearing wheels having projections, the projections of the different series of wheels being different in form, two wedges each adapted to contact with one of the series of fingers, and a connection between the turnstile and the wedges whereby the latter are moved longitudinally to bring the members of the series of fingers into or out of operative position, substantially as described.

In testimony whereof I affix my signature in presence of two witnesses.

ADOLPH G. GROMMET.

Witnesses:
E. L. WILSON,
J. P. DICKINSON.